Oct. 15, 1929.  G. A. TRAUGER  1,731,642
PICKER AND WAGON HITCH
Filed Oct. 12, 1927
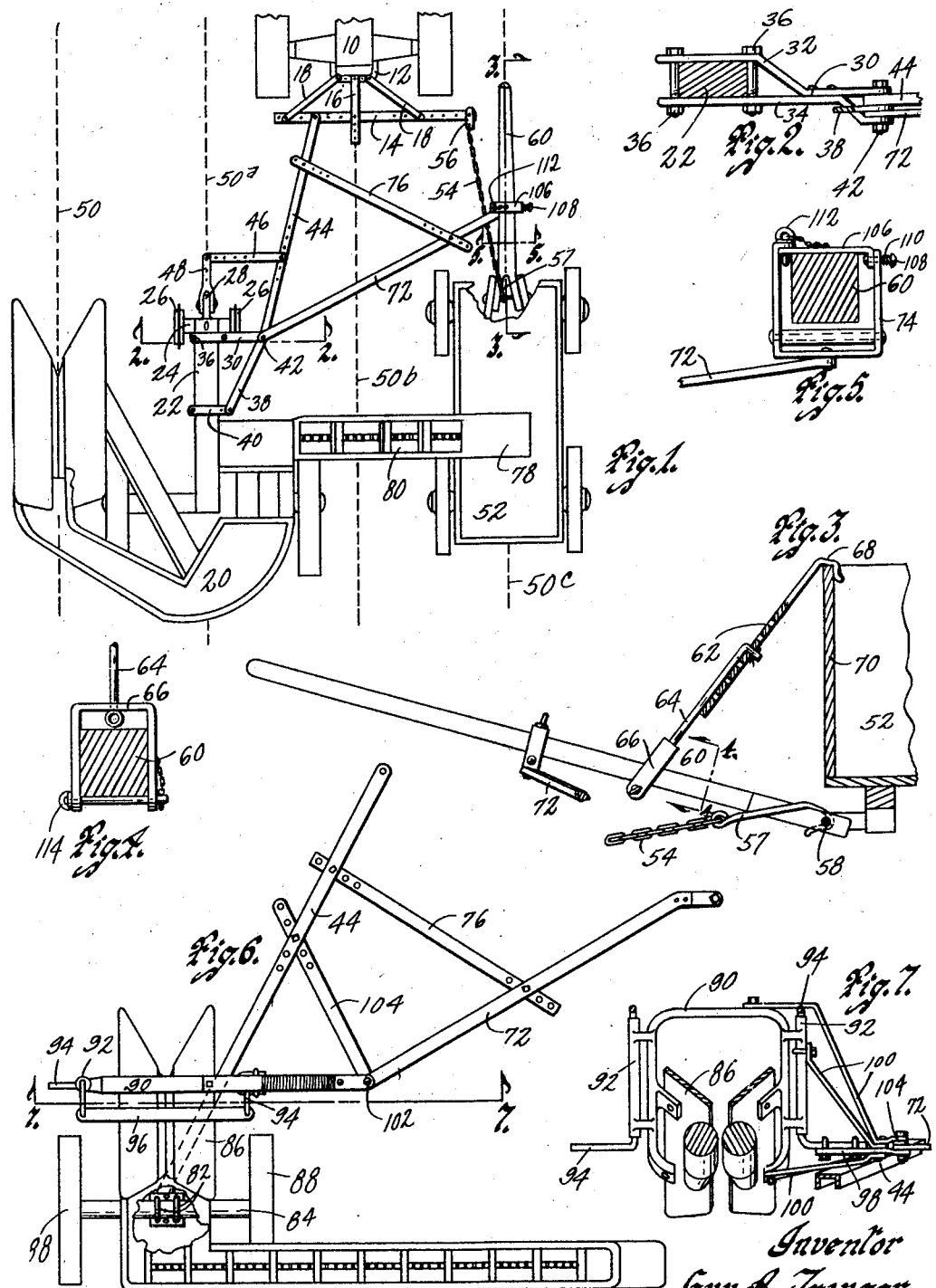
Witness
L. F. Sandberg
Inventor
Guy A. Trauger
by Bair & Freeman
Attorneys Patented Oct. 15, 1929

1,731,642

UNITED STATES PATENT OFFICE

GUY A. TRAUGER, OF ALDEN, IOWA

PICKER AND WAGON HITCH

Application filed October 12, 1927. Serial No. 225,701.

The object of my invention is to provide a picker and wagon hitch adapted for use with tractors, the parts thereof being of simple, durable, and comparatively inexpensive construction.

More particularly it is my object to provide a hitch of this character in which the picker can be trailed behind and toward one side of the tractor and the wagon can be trailed behind and toward the other side of the tractor whereby the ear corn elevator of the picker discharges the corn into the wagon without the necessity of having to drive a team along behind the tractor to get the corn from the picker.

A further object of my invention is to so connect the wagon and the picker together that steering movement of the picker will effect steering movement of the wagon whereby the wagon will at all times be in proper position to receive the corn from the ear corn elevator of the picker even when turning a corner in either direction.

With these and other objects in view, my invention consists in the construction, arrangement and combination of the various parts of my picker and wagon hitch whereby the objects contemplated are attained, as hereinafter more fully set forth, pointed out in my claim, and illustrated in the accompanying drawings, in which:

Figure 1 is a plan view of my improved picker and wagon hitch illustrating a portion of the tractor and the picker and wagon connected thereto as when the device is in operation.

Figure 2 is an enlarged detail sectional view of a portion of the picker draw bar and its operative connection to the tongue of the picker as taken on the line 2—2 of Figure 1.

Figure 3 is a sectional view through the tongue of the wagon illustrating one manner of supporting the tongue.

Figure 4 is an enlarged sectional view taken on the line 4—4 of Figure 3.

Figure 5 is an enlarged sectional view taken on the line 5—5 of Figure 1.

Figure 6 is a plan view of a portion of my hitch illustrating its connection to a truckless type of picker; and Figure 7 is a detail sectional view taken on the line 7—7 of Figure 6.

On the accompanying drawings I have used the reference numeral 10 to indicate a tractor. The tractor 10 is usually provided with a draw bar 12 to which I connect my improved hitch device.

My hitch comprises a main draw bar 14 extending transversely relative to the tractor 10 and connected by a bar 16 to the draw bar 12 of the tractor. Suitable braces 18 may be provided to keep the main draw bar 14 in proper position with respect to the tractor.

In Figure 1 the picker which is to be drawn by the tractor 10 is indicated generally by the reference numeral 20. The picker 20 includes a stub tongue 22 having steerable trucks at its front end. The trucks comprise an axle 24 having wheels 26 thereon. The trucks also include a short tongue 28 whereby swinging movement of the tongue 28 will steer the trucks and consequently the picker itself.

On the stub tongue 22 of the picker 20 I mount a bracket 30 comprising an upper bar 32 and a lower bar 34 clamped against the tongue 22 by bolts 36 as clearly illustrated in Figure 2 of the drawings.

A brace 38 attached to the stub tongue 22 by a clamp member 40 similar to the bars 32 and 34 is provided for the bracket 30.

Extending from one end of the main draw bar 14 to the outer end 42 of the bracket 30 is a picker draw bar 44. The picker draw bar 44 is connected by a link 46 to an extension 48 secured to the truck steering tongue 28.

From the construction of the parts just described it will be obvious that swinging movement of the picker draw bar 44 on the pivotal connection 42 with respect to the bracket 30 will cause steering movement of the front trucks of the picker 20. In this manner the picker is trailed behind the tractor and offset therefrom so that it will pick corn in the proper row as indicated at 50. Other rows of corn and their relation to the various devices illustrated in Figure 1 are indicated by the dotted lines 50<sup>a</sup>, 50<sup>b</sup>, and 50<sup>c</sup>. The construction of the bars 32 and 34 as will be noted in Figure 2 positions the draw bar 44 quite low with respect to the stub tongue 22. I have found this a very desirable construction in a hitch of this character.

A wagon 52 is provided with a hitch connection to the main draw bar 14 which is so constructed that the wagon will straddle the row of corn 50<sup>c</sup>. In the use of my device the corn is picked from the right toward the left of the field so that the rows 50<sup>a</sup>, 50<sup>b</sup>, and 50<sup>c</sup> have already been picked and it is immaterial therefore whether or not the corn stalks in them are knocked down by the front trucks of the picker, the tractor or the wagon.

For pulling the wagon 52 I provide a chain connection 54 connected to a clevis 56 which in turn is connected to the main draw bar 14 adjacent the end thereof and opposite the picker draw bar 44. The chain 54 may be provided with a hook 57 adapted to hook over the pivot bolt 58 to be found in the hounds of a wagon of ordinary construction called a farm wagon. In this manner the wagon 52 is pulled by the tractor.

For supporting the tongue 60 of the wagon which is pivoted on the pin 58 I provide a bar 62. This bar 62 is connected by a rod 64 to a clamp device 66 secured to the tongue of the wagon and has at its upper end a hook 68 adapted to be hooked over the front end gate 70 of the wagon 52. The bar 62 has a series of openings to selectively receive the upper end of the rod 64.

For guiding the tongue 60 of the wagon 52 I provide a guide member 72 pivoted to a frame 74 through which the tongue 60 is loosely mounted as clearly illustrated in Figure 5 of the drawings. To prevent movement of the guiding bar 72 with respect to the picker draw bar 44 I provide a brace 76. It will be noted that each of the bars 14, 44, 46, 48, and 76 are provided with a plurality of openings whereby various adjustments of the hitch parts with respect to each other may be made to meet the requirements of rows of corn different distances apart to fit pickers and wagons of different makes.

I have found a distinct advantage in providing the guiding bar 72 operated by the picker draw bar 44. This advantage lies in the fact that steering movement of the wagon 52 is effected by the steering movement of the picker 20 itself. Therefore when turning a right hand corner the tongue engaging end of the guiding bar 72 extends toward the right and slides forwardly on the tongue 60 which tends to keep the wagon 52 underneath the discharge end 78 of the ear corn conveyor 80 which is a part of the picker 20. In turning to the left the tongue engaging end of the guide bar 72 slides rearwardly on the tongue 60 and pulls it toward the left for the purpose of keeping the wagon 52 beneath the discharge end of the ear corn conveyor 70. I have found this construction keeps the wagon in proper position which is impossible when drawing the wagon from the draw bar 14 and steering it from there also.

In Figure 6 I have illustrated a modified form of my invention in which the picker draw bar 44 is connected by U-bolts or the like 82 to the axle 84 of a picker 86. The picker 86 is of the truckless type and is entirely supported on the two wheels 88. This type of picker includes an arch frame having tubular bearings 92 secured to it. Bell crank devices 94 connected by a link 96 are provided in this type of picker as an equalizer for a team of horses when pulling the picker. I provide a bracket 98 secured to one of the bell crank devices 94 by U bolts or the like which bracket is suitably braced by the braces 100 extending to the arch frame 90 and to one of the tubular bearings 92. The outer end 102 of the bracket 98 serves to connect the wagon guide bar 72 to the picker 86 and picker draw bar 44. A brace 104 extends from the connection 102 to the bar 44 to make a two-point connection for the draw bar 44 with respect to the picker 86. The bar 76 is provided to connect the guide bar 72 with the draw bar 44 the same as in the form of construction illustrated in Figure 1.

For convenience in inserting the tongue 60 in the frame 74, a portion 106 of this frame is loosely pivoted on the pin 108. A spring 110 is positioned on the pin 108 to hold one end of the parts 74 and 106 together. A pin 112 is dropped through ears on the ends of the parts 74 and 106 to hold their other end together.

The clamp 66 is provided with a pin 114 adapted to support the tongue 60. The rod 64 may be adjusted relative to the bar 62 to place the tongue 60 at the desired height or to accommodate end gates 70 of different heights.

Some changes may be made in the various parts of my device such as using bars of different cross sectional shape or arranging them of different dimensions without departing from the purpose of my invention. It is my intention therefore to cover in my claim, modifications and equivalents which may be reasonably included within the scope of the claim.

I claim as my invention:

The combination with a wagon, a tractor and a harvester adapted to respectively straddle successive rows of grain to be harvested and delivered to said wagon, of a hitch comprising a transverse draw bar at the rear of said tractor, flexible means secured thereto between the first and second rows of grain and extending to the front steerable axle of said wagon for pulling the wagon, a wagon tongue guide member rigidly secured to said harvester tongue and terminating in a fitting adapted to loosely receive the tongue of said wagon whereby said tongue is free to slide relative thereto, said fitting being substantially spaced from the connection point of said flexible means to said wagon.

Des Moines, Iowa, September 16, 1927.

GUY A. TRAUGER.